April 4, 1967     D. W. STEWART     3,312,236
TORQUE TRANSMITTING COUPLING FOR IRRIGATION WHEEL
Filed April 15, 1964
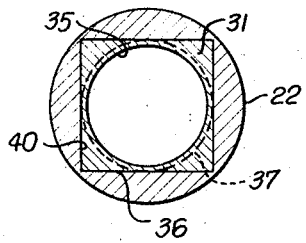
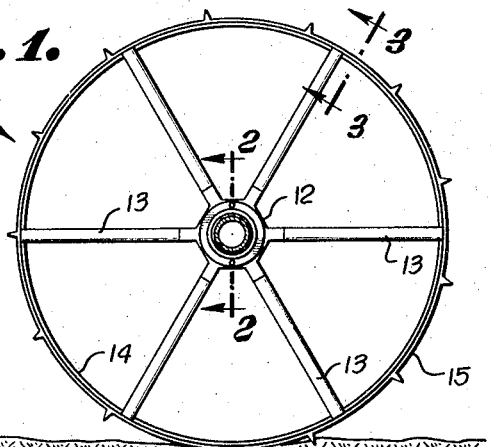
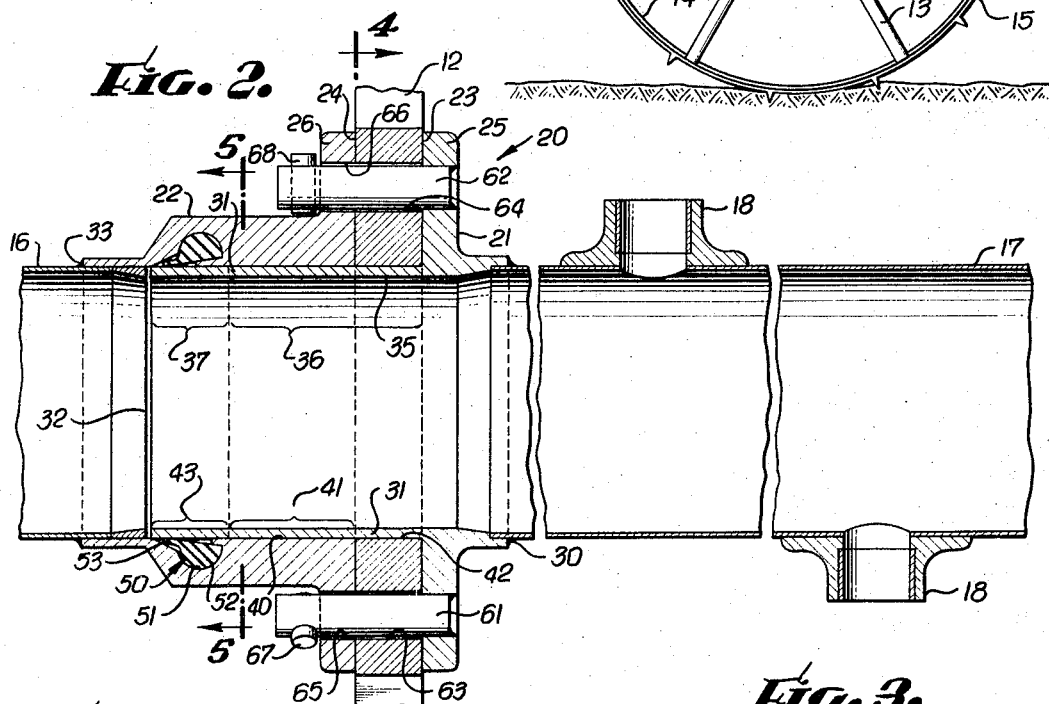
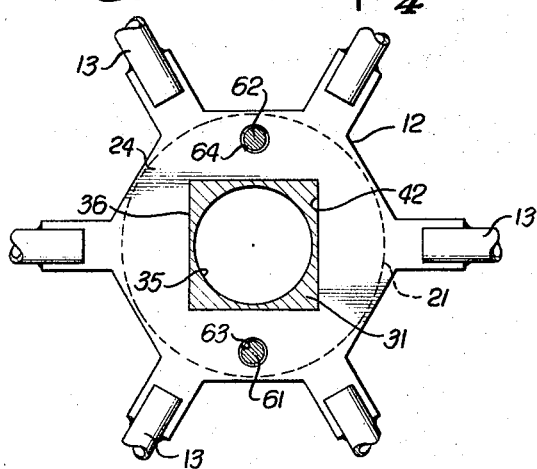
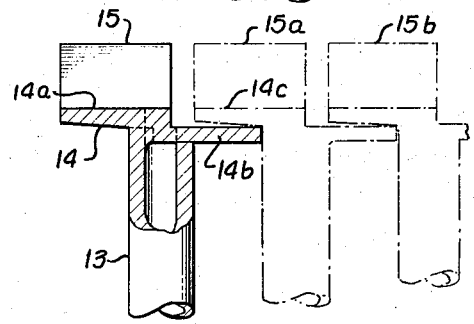
INVENTOR.
DILLARD W. STEWART
BY *Vernon D. Beehler*
ATTORNEY.

United States Patent Office 3,312,236
Patented Apr. 4, 1967

3,312,236
TORQUE TRANSMITTING COUPLING FOR
IRRIGATION WHEEL
Dillard W. Stewart, 3753 E. Ave I,
Lancaster, Calif. 93534
Filed Apr. 15, 1964, Ser. No. 360,144
4 Claims. (Cl. 137—344)

This invention relates generally to those large portable irrigation systems used on farms, in which irrigation pipes are supported on wheels keyed to rotate with them, and the entire system is periodically moved by rotating the pipe and driving all the wheels disposed along its length. In such systems, each wheel is mounted on a special type of coupling, which connects two sections of irrigation pipe, is provided with an internal passage for the through flow of irrigation water, and in addition operates to transmit torque from one section of pipe to the other, and to the wheel mounted on the coupling.

More particularly, this invention relates to an improved wheel and coupling assembly, in which torque is transmitted by coupling and hub sections of rectangular cross section, while sealing is accomplished by internal sealing means of cylindrical cross section.

Wheel-transported irrigation systems are often assembled in several pipe sections to extend across the entire width of a planted field, with supporting wheels mounted on pipe couplings and spaced along the pipe a distance corresponding to the width of several plant rows. An important requirement of such systems is that they must be adapted to quick and easy assembly and disassembly, preferably without tools. The bulky parts, particularly their wheels, which may be over six feet in diameter, must occasionally be disassembled from the pipe, stored, or transported.

Unfortunately, the designs presently employed in the art have had to sacrifice both convenience of assembly and compactness of components, in order to achieve satisfactory security of torque transmission. Most of these designs transmit the torque by means of bolted flanges or the like, complete with all the problems as suitable wrenches, bolts with damaged or rusted threads, lost nuts, etc. The wheels themselves have been the natural outgrowth of the bulky couplings employed, and have generally been so wide in the dimension along the axis that they could be stacked only as half wheels.

Moreover, in spite of all the bolts and nuts in the coupling assembly, and the application of wrenching almost to the point of stripping threads, designs heretofore known have been prone to develop leakage of irrigation water from the couplings. They have generally depended on water tightness for the close mating of surfaces exposed to damage, and various types of coupling gaskets, which failed to seat properly to some part of the assembly if slightly deformed, as a result of rough use, or if the gasket itself, being exposed, is cracked or damaged.

It has been a common and undesirable characteristic of many of the previous designs, that torque has been transmitted from one coupling member to the other, by a number of flange bolts distributed around the periphery of the two coupling members. This arrangement burdens the user with the nuisance of many bolts and nuts. Moreover, in the event of deformation of some of the threaded studs or bolts, or the coupling members with which they are assembled, the entire torque may be concentrated on only two or three of the bolts.

It is a primary object of the present invention to provide a wheel and coupling assembly for irrigation systems in which bolts and nuts or other threaded fasteners or devices are completely unnecessary.

It is another major object of the present invention to provide a wheel and coupling members which may be stored or transported in nested or telescoping assembly.

It is a further important object of the present invention to achieve both of the foregoing objects with a coupling which is capable of remaining water tight, despite the long rough usage, by virtue of a self-contained internal sealing system.

The foregoing and other objects and advantages of the invention are achieved by means of a design which abandons the multiplicity of bolts or other connectors in favor of torque transmission by a single massive rectangular, or polygonal, shaft.

In the past, such torque transmission has been deemed unsuited to irrigation lines, because there appeared no way to adequately seal the coupling to prevent leakage of irrigation water through it. Sealing around the rectangular shaft portion is impractical. If sealing between a coupling flange and the surface of the wheel hub is relied upon, then bolts and nuts are required to make the seal tight.

The present invention overcomes these problems by employing a coupling comprised pull members and reception members, in which each has torque-tranmitting portions of rectangular cross section, and sealing sections of cylindrical cross section.

The invention will best be understood from the following description, and accompanying drawings, of one preferred specific embodiment, although it will be appreciated that the invention is not restricted to the preferred form which is described for purposes of disclosure.

In the drawings:

FIGURE 1 is a side elevational view of a pipe-transporting wheel for use in a wheel and coupling assembly designed according to the present invention;

FIGURE 2 is a longitudinal sectional view through the wheel of FIGURE 1, and a coupling constructed according to the present invention assembled thereon, as viewed at a vertical axial plane indicated in FIGURE 1 by the arrows 2—2;

FIGURE 3 is a fragmentary sectional view of a detail of the rim of the wheel of FIGURE 1 as viewed at the plane indicated by the arrows 3—3 in FIGURE 1;

FIGURE 4 is a view along the axis of the wheel, taken at the plane indicated at the arrows 4—4 of FIGURE 2; and FIGURE 5 is a sectional view transverse to the axis of the wheel and coupling assembly, taken at the plane and viewed in the direction indicated by the arrows 5—5 in FIGURE 2.

In FIGURE 1, a wheel and coupling assembly indicated generally by the numeral 10 is seen to be resting on the ground surface 11. In the particular embodiment illustrated, the central hub 12 is an aluminum casting or the like, and is assembled with spokes 13 and a rim 14 into a wheel 15 which provides rolling support for an irrigation conduit, indicated in FIGURE 2 by the two pipe sections 16 and 17.

Pipe sections 16 and 17 are provided with sprinkler outlets 18 distributed along their lengths, and disposed in an arrangement selected by the user at the time of assembly.

In use, power means are employed to rotate the pipe comprised of sections 16 and 17, periodically, or continuously, to transport it slowly over the field which is being irrigated.

FIGURE 2 reveals in section the assembly of the coupling of the invention to the wheel hub 12. It is seen that the coupling indicated generally by the numeral 20 is comprised of a probe, or male member 21, and a reception, or female member 22. The hub 12 is seen to be faced on opposite sides with flat mounting surfaces 23 and 24 disposed in planes transverse to the axis of hub 12. Coupling members 21 and 22 have flat-surfaced annular mounting flanges 25 and 26 which mate with hub mounting surfaces 23 and 24, respectively.

The probe member 21 is welded or pressed on to the end of conduit 17 as indicated at 30, and is provided with a tubular probe 31 which extends all the way through wheel hub 12 and coupling 22 to a short transitional opening 32 for conduit 16, which is welded or press fitted into reception member 22 as indicated at 33.

The entire coupling 21, including probe 31, is provided with an internal cylindrical bore 35 which provides smooth and continuous flow of irrigation water between conduits 16 and 17, without the introduction of irregularities of passage cross section.

Although the internal passage 35 is cylindrical like the interior of pipes 16 and 17, probe 31 is rectangular in external cross section over that portion of its length indicated by the numeral 36, and cylindrical in external cross section over that part of its length indicated by the numeral 37. These longitudinal sections of probe 31 may be identified by function as torque section 36 and sealing section 37. The torque section 36 is rectangular in cross section in the preferred specific embodiment, but it will be appreciated that a torque transmitting polygon could be used instead of a rectangle.

The reception coupling member 22 has an internal passage 40 adapted to closely receive probe 31. The passage 40 is formed along part of its axial length, indicated by the numeral 41, with a rectangular internal cross section mating with a rectangular central opening 42 in hub 12, so that the torque section 36 of probe 31, transmits rotational drive between coupling members 21 and 22, and wheel 15.

The internal passage 40 of reception member 22 has a sealing section 43, in the form of a cylindrical bore spaced away from wheel hub 12 by the rectangular passage 41. A water tight seal is achieved between the cylindrical exterior surface 37 of probe 31, and the cylindrical sealing passage 43 to accommodate it. Sealing 40 by virtue of a sealing ring 50, which is housed in an internal annular groove 51 specially formed in the cylindrical sealing passage 43 to accommodate it. Sealing ring may be made of a suitable material such as neoprene rubber, vinyl, or the like, and need only have suitable rubber-like elasticity, sealing qualities and resistance to deterioration and leakage. Preferably, it is formed as shown with a relatively massive retained portion 52 and an annular lip 53 for sliding and sealing contact over sealing surface 37.

Coupling members 21 and 22 are retained in assembly on hub 12 by any suitable means, and such means may be very simple since it need not transmit torque or impart sealing pressure. In the preferred embodiment shown, the assembly is held together by two longtiudinal pins 61 and 62, disposed parallel to the axis of the entire assembly, and permanently attached in the flange 25 of probe member 21. The pins 61 and 62 pass loosely through longitudinal bores 63 and 64 in hub 12, and mating longitudinal bores 65 and 66 in the flange 26 of reception member 22. The projecting ends of locating pins 61 and 62 need not be tightly fastened, but may be retained simply by transverse pins 67 and 68. However, transverse pins 67 and 68 must fit close enough to the flange 26 to prevent disassembly by water pressure.

It will be seen from the foregoing description of the preferred specific embodiment of the invention, water tightness is achieved by a cylindrical sealing means which is then tunneled and protected from exposure to abuse when the coupling is in a disassembled condition. Moreover, although the sealing means is cylindrical, the torque transmitting portion of the coupling members 21 and 22, and the hub 12, are rectangular and so massive that deformation is much less likely than if torque were transmitted by a number of relatively small torque transmitting means such as bolts, toggles, or the like.

Moreover, the entire system is susceptible of convenient nesting for transport and storage. The nestability of coupling members 21 and 22 are obvious from the longitudinal sectional view of FIGURE 2. The nestability of the wheels 15 is best seen from the detail section of rim 14, seen in FIGURE 3. It will be appreciated that it is desirable to provide the wheels 15 with both a cylindrical surface 14a and a radial gripping lug 14b, for best traction over wet ground. As seen in FIGURE 3, the lugs 14b are half width lugs carried on a cylindrical surface 14a which is outwardly displaced from spoke 13 so as to telescopically assemble over a second cylindrical rim portion 14c, of slightly smaller radius, as indicated by the dashed outlines of other wheels 15a and 15b in FIGURES 3.

Although I have described one preferred specific embodiment of the invention, which is adapted to ease of manufacture and widespread utility, as well as reliability and use, it will be appreciated that full equivalents of my invention could be constructed by modifying or augmenting many of the details of the particular embodiment described, and it is my intention to claim as my invention all such variations which fall within the scope of the following claims.

It will be understood that a perfectly square hub section 36 is much preferred in the construction of my invention. However, the invention is not limited to perfectly square sections, and in less preferred forms, may include any suitable rectangular or polygonal shapes.

Having thus described my invention, what I claim as new and desire to secure by Letters Patent is:

1. In a movable irrigation system, a wheel and coupling assembly which includes:
   a wheel having a hub with an axial passage of non-circular cross section therethrough;
   a reception coupling member having an internal passage with a torque portion of non-circular cross section mating with said hub opening adjacent said hub, and a sealing portion spaced from said hub;
   a hollow conduit probe coupling member having an elongated probe closely received through said hub opening and into said reception member passage, said wheel, said reception coupling member and said probe coupling member adapted to be connected together in coupled relationship, said probe having a torque section of non-circular external cross section mating with said hub opening and said torque portion, and a sealing section mating with said sealing portion;
   and sealing means between said sealing portion and said sealing section of said probe.

2. In a movable irrigation system, a wheel and coupling assembly which includes:
   a wheel having a central hub with an axial passage of rectangular cross section and mounting surfaces on each side of said hub;
   a reception member mating with one side of said hub and having an internal passage with a torque transmitting portion of rectangular cross section mating with said hub opening adjacent said hub, and a sealing portion of circular cross section spaced from said hub;
   a hollow conduit probe member mating with an opposite mounting surface on said hub with an elongated probe closely received through said hub opening and into said reception member passage, said probe having a torque section of rectangular external cross section mating with said hub opening and said torque transmitting portion of said reception member, and a sealing section of circular external cross section mating with said sealing portion of said reception member;

a sealing ring of resilient rubber-like material disposed in an annular groove in the interior of said sealing portion and effecting sealing contact with the circular exterior surface of said sealing section, of said probe;

and attachment means for holding said reception and probe members in assembly with said hub.

3. In a movable irrigation system, a wheel and coupling assembly which includes:

a wheel having a central hub with an axial passage of rectangular cross section and planar mounting surfaces transverse to said axial passage on each side of said hub;

a reception member having an annular flange mating with one of said planar mounting surfaces and having an internal passage with a torque transmitting portion of rectangular cross section mating with said hub opening adjacent said hub, and a sealing portion of circular cross section spaced from said hub by said torque transmitting portion.

a hollow conduit probe member having an annular flange mating with a mounting surface on said hub with an elongated probe closely received through said hub opening and into said reception member passage, said probe having a torque section of rectangular external cross section mating with said hub opening and said torque transmitting portion of the reception member, and a sealing section of circular external cross section mating with said sealing portion of the reception member;

a sealing ring of resilient rubber-like material disposed in an annular groove in the interior of said sealing passage and effecting sealing contact with the circular exterior surface of said sealing section of said probe;

and attachment means for holding said reception and probe members in assembly with said hub.

4. In a movable irrigation system, a wheel and coupling assembly which includes:

a wheel having a central hub with an axial passage of rectangular cross section and planar mounting surfaces transverse to said axial passage on each side of said hub;

a reception member having an annular flange mating with one of said planar mounting surfaces and having an internal passage with a torque transmitting portion of rectangular cross section mating with said hub opening adjacent said hub, and a sealing portion of circular cross section spaced from said hub by said torque transmitting portion;

a hollow conduit probe member having an annular flange mating with a mounting surface on said hub with an elongated probe closely received through said hub opening and into said reception member passage, said probe having a torque section of rectangular external cross section mating with said hub opening and said torque transmitting portion of the reception member, and a sealing section of circular external cross section mating with said sealing portion of the reception member;

a sealing ring of resilient rubber-like material, said ring having a body portion disposed in an annular groove in the interior of said sealing portion and an annular flange effecting sealing contact with the circular exterior surface of said sealing section of said probe;

and locating pin means passing longitudinally through said hub and engaging said flanges for locating and holding said reception and probe members in assembly with said hub.

References Cited by the Examiner
UNITED STATES PATENTS

| 2,665,169 | 1/1954 | Tipton | 239—212 |
| 2,702,717 | 2/1955 | Cornelius | 285—5 |
| 2,766,996 | 10/1956 | Jacoby | 285—5 |
| 3,217,737 | 11/1965 | Jensen | 137—344 |

FOREIGN PATENTS

| 135,724 | 1919 | Great Britain. |

CARL W. TOMLIN, *Primary Examiner.*

R. GIANGIORGI, T. F. CALLAGHAN,
*Assistant Examiners.*